(12) United States Patent
Shiraki et al.

(10) Patent No.: US 11,904,734 B2
(45) Date of Patent: Feb. 20, 2024

(54) SEAT SLIDER DEVICE

(71) Applicants: TOYOTA BODY SEIKO CO., LTD., Takahama (JP); TOYOTA BOSHOKU KABUSHIKI KAISHA, Kariya (JP); ENSHU CO., LTD., Iwata (JP)

(72) Inventors: Shin Shiraki, Takahama (JP); Teruhiko Karasawa, Takahama (JP); Takashi Hattori, Nisshin (JP); Shun Fujishiro, Chiryu (JP); Yoshitaka Sasayama, Iwata (JP)

(73) Assignees: TOYOTA BODY SEIKO CO., LTD., Takahama (JP); TOYOTA BOSHOKU KABUSHIKI KAISHA, Kariya (JP); ENSHU CO., LTD., Iwata (JP)

( * ) Notice: Subject to any disclaimer, the term of this patent is extended or adjusted under 35 U.S.C. 154(b) by 473 days.

(21) Appl. No.: 17/092,940

(22) Filed: Nov. 9, 2020

(65) Prior Publication Data

US 2021/0188132 A1 Jun. 24, 2021

(30) Foreign Application Priority Data

Dec. 18, 2019 (JP) ................................. 2019-228554

(51) Int. Cl.
*B60N 2/07* (2006.01)
*F16C 29/04* (2006.01)

(52) U.S. Cl.
CPC ......... *B60N 2/0722* (2013.01); *B60N 2/0705* (2013.01); *F16C 29/04* (2013.01)

(58) Field of Classification Search
CPC .. B60N 2/0722; B60N 2/0732; B60N 2/0705; B60N 2/07; B60N 2/0707; B60N 2/0715; F16C 29/04

(Continued)

(56) References Cited

U.S. PATENT DOCUMENTS 7,648,115 B2 * 1/2010 Lambert ............. B60N 2/0837
297/344.1
8,845,225 B2 * 9/2014 Schmidt ................. B61D 17/18
403/252

(Continued)

FOREIGN PATENT DOCUMENTS

JP S48-027152 A 4/1973
JP 2004-090764 A 3/2004

(Continued)

OTHER PUBLICATIONS

Jun. 27, 2023 Office Action issued in Japanese Patent Application No. 2019-228554.

*Primary Examiner* — Nkeisha Smith
(74) *Attorney, Agent, or Firm* — Oliff PLC

(57) ABSTRACT

A seat slider device may include an upper rail; a lower rail slidably holding the upper rail; a bolt fixing the lower rail to a vehicle body; a washer through which the bolt passes; and a retainer retaining the bolt to the lower rail before the lower rail is fixed to the vehicle body with the bolt. The lower rail may include a bottom plate; a pair of outer vertical plates extending upward respectively from ends of the bottom plate; a pair of upper plates horizontally extending respectively from upper ends of the outer vertical plates to an inside of the lower rail; and a pair of inner vertical plates extending downward respectively from inner ends of the upper plates. The retainer may be arranged in the lower rail and configured to retain the bolt with the bolt through the washer and the through hole.

3 Claims, 11 Drawing Sheets

(58) Field of Classification Search
USPC .................................................. 248/428, 430
See application file for complete search history.

(56) References Cited

U.S. PATENT DOCUMENTS

| | | | | |
|---|---|---|---|---|
| 9,150,125 | B2* | 10/2015 | Hayashi | B60N 2/0875 |
| 9,327,615 | B2* | 5/2016 | Yamada | F16C 29/043 |
| 9,573,491 | B2* | 2/2017 | Schumann | B60N 2/0715 |
| 9,630,583 | B2* | 4/2017 | Park | B60N 2/002 |
| 9,755,571 | B2* | 9/2017 | Almy | H02S 20/23 |
| 9,802,511 | B2* | 10/2017 | Matsushima | B60N 2/0818 |
| 10,173,560 | B2* | 1/2019 | Ochs | B60N 2/542 |
| 10,351,021 | B2* | 7/2019 | Nagatani | B60N 2/42736 |
| 2004/0141806 | A1 | 7/2004 | Wake et al. | |
| 2021/0001753 | A1* | 1/2021 | Okumura | B60R 16/02 |

FOREIGN PATENT DOCUMENTS

| | | |
|---|---|---|
| JP | 2004-169863 A | 6/2004 |
| JP | 2004-322678 A | 11/2004 |
| JP | 3176402 U | 6/2012 |
| JP | 2013-104501 A | 5/2013 |
| WO | 2016/031748 A1 | 3/2016 |

* cited by examiner

SEAT SLIDER DEVICE

CROSS-REFERENCE TO RELATED APPLICATION

This application claims priority to Japanese Patent Application No. 2019-228554 filed on Dec. 18, 2019, the contents of which are hereby incorporated by reference into the present application.

TECHNICAL FIELD

The teaching disclosed herein relates to a seat slider device configured to slide a seat of a vehicle. In particular, the teaching disclosed herein relates to a seat slider device that can be easily attached to a vehicle.

BACKGROUND

A seat slider device includes an upper rail attachable to a seat and a lower rail that slidably holds the upper rail and is attached to a vehicle. The lower rail is provided with an elongate bottom plate including a through hole, a pair of outer vertical plates, a pair of upper plates, and a pair of inner vertical plates. The outer vertical plates extend upward respectively from ends of the bottom plate in a short direction. The upper plates horizontally extend respectively from upper ends of the outer vertical plates to inside of the lower rail. The inner vertical plates extend downward respectively from inner ends of the upper plates.

The lower rail is fixed to the vehicle body with a bolt that passes through the through hole of the bottom plate. It is burdensome to pass the bolt between the inner vertical plates after the lower rail has been set to the vehicle body. Japanese Patent Application Publication No. 2004-322678 describes a seat slider device that temporarily retains a bolt in its lower rail before the lower rail is fixed to a vehicle body with the bolt. In the seat slider device of Japanese Patent Application Publication No. 2004-322678, the bolt is temporarily retained, with the bolt passing through a washer and a bottom plate of the lower rail, by a toothed retaining ring from below the bottom plate.

SUMMARY

In the seat slider device of Japanese Patent Application Publication No. 2004-322678, the retaining ring remains between the bottom plate and the vehicle body when the lower rail is attached to the vehicle body, which results in an unnecessary gap between the bottom plate and the vehicle body.

In a seat slider device disclosed herein, a retainer configured to temporarily retain a bolt and a washer in a lower rail is disposed inside a lower rail. Thus, there is no unnecessary gap between a bottom plate of the lower rail and a vehicle body in this seat slider device. As mentioned above, the lower rail comprises an elongate bottom plate including a through hole, a pair of outer vertical plates, a pair of upper plates, and a pair of inner vertical plates.

In one aspect, the retainer may comprise a spacer constituted of resin and a retaining ring constituted of resin. The spacer may be integrated on the washer and have a tube shape. An outer diameter of the spacer may be larger than a gap (interval) between the pair of inner vertical plates. An inner diameter of the spacer may be equal to or larger than an outer diameter of a head of the bolt. The retaining ring may be provided on an inner surface of the washer, and a threaded portion of the bolt may be press-fitted to the retaining ring. A groove may be provided in a surface of the washer, and the spacer and the retaining ring may be connected to each other by a resin rod disposed in the groove.

With a mere use of the retaining ring, which is provided on the inner surface of the thin washer, alone, the bolt may detach from the washer together with the retaining ring. The retaining ring is connected to the spacer by the resin rod in the groove of the washer, thus it is less likely to detach from the washer. Further, the spacer, which is held between the bottom plate and the pair of inner vertical plates, prevents the washer and the bolt from detaching from the lower rail.

Although the resin rod is disposed in the groove of the washer, the surface of the washer is not covered with resin. Since there is no resin between the head of the bolt and the washer and also between the washer and the bottom plate, the bottom plate (lower rail) can be firmly fixed with the bolt to the vehicle body. The resin rod may fill the groove of the washer with no space left therein.

In another aspect, the retainer may have a U-shape. The retainer may be disposed in the lower rail with the U-shape inversed. Both ends of the retainer (both ends of the U-shape) may be in contact with the bottom plate of the lower rail and a center of the retainer (center of the U-shape) may be in contact with the pair of inner vertical plates. The retainer may be held in the lower rail by being compressed between the bottom plate and the pair of inner vertical plates. A hole may be provided in the center of the retainer, and the bolt may be press-fitted in the hole. The washer may be held between the center of the retainer and the pair of inner vertical plates. The retainer may include a hook configured to hold the washer.

The washer may be held between the retainer and the bottom plate instead of between the center of the retainer and the pair of inner vertical plates. For example, the retainer may comprise an arm extending from one of the both ends of the retainer (one of the ends of the U-shape) along the bottom plate, and the washer may be held between the arm and the bottom plate.

In yet another aspect, the retainer may be a thin plate including a hole in which the bolt is press-fitted. The retainer may comprise an outer hook extending upward from an outer edge of the thin plate and configured to hold the washer. The retainer may further comprise an inner hook extending downward from an edge of the hole. The inner hook may be configured to be hooked on the through hole of the bottom plate to temporarily retain the washer and the bolt.

In any of the aspects above, the retainer temporarily retains the bolt and the washer within the lower rail. Thus, no unnecessary gap is left between the bottom plate and the vehicle body when the lower rail is attached to the vehicle body. It should be noted that in the third aspect, the inner hook remains between the bottom plate and the vehicle body, however, the inner hook can be crushed between the bottom plate and the vehicle body, resulting in no unnecessary gap therebetween.

Details and further developments of the art disclosed herein will be described in DETAILED DESCRIPTION as below.

BRIEF DESCRIPTION OF DRAWINGS

DETAILED DESCRIPTION (First Embodiment) A seat slider device 2 according to a first embodiment will be described with reference to the drawings. FIG. 1 shows a side view of the seat slider device 2 attached to a vehicle. The seat slider device 2 comprises a lower rail 10 and an upper rail 20. The lower rail 10 extends long. The lower rail 10 holds the upper rail 20 movably (slidably) in its longitudinal direction.

Figure 1:
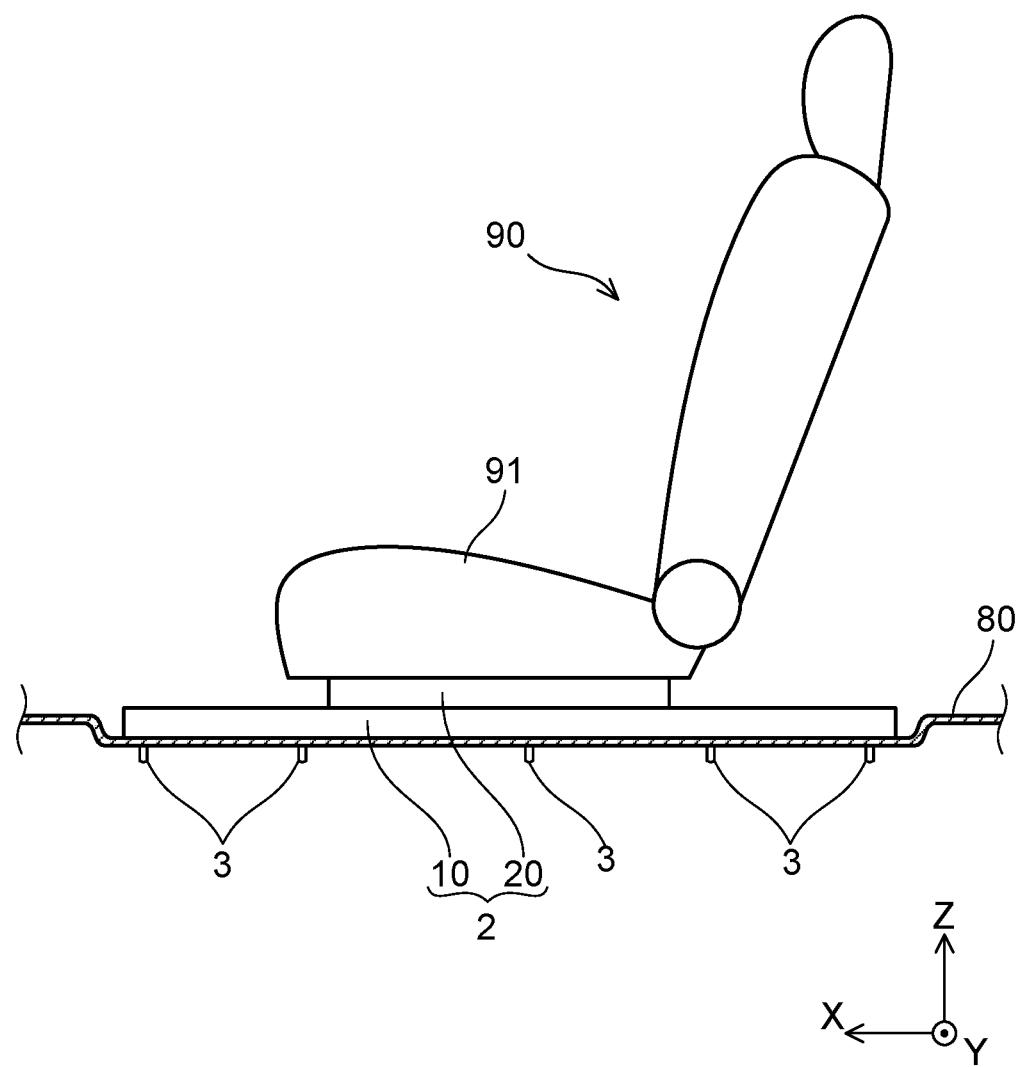
FIG. 1 is an external view of a seat slider device according to a first embodiment.

The lower rail 10 is fixed to a floor panel 80 of the vehicle body with a plurality of bolts 3. The upper rail 20 is attached to a lower portion of a cushion (seat cushion 91) of a seat 90. The upper rail 20 is attached to the lower portion of the seat cushion 91 via a frame (not shown). The seat slider device 2 is attached to each of right and left sides of the lower portion of the seat cushion 91. In the coordinate system of the drawings, an X direction corresponds to a longitudinal direction of the lower rail 10 and the upper rail 20, a Y direction corresponds to a short direction of the rails, and a +Z direction corresponds to an upward direction. Hereinafter, the longitudinal direction of the lower rail 10 (X direction in the coordinate system of the drawings) will be termed a rail longitudinal direction, and the short direction of the lower rail 10 (Y direction in the coordinate system of the drawings) will be termed a rail short direction.

As described, the lower rail 10 is fixed to the floor panel 80 of the vehicle body with the plurality of bolts 3. The seat slider device 2 according to the present embodiment enables the bolts 3 to be temporarily retained to the lower rail 10 before the lower rail 10 is attached to the vehicle body to facilitate the attachment of the lower rail 10 to the vehicle body.

Figure 2:
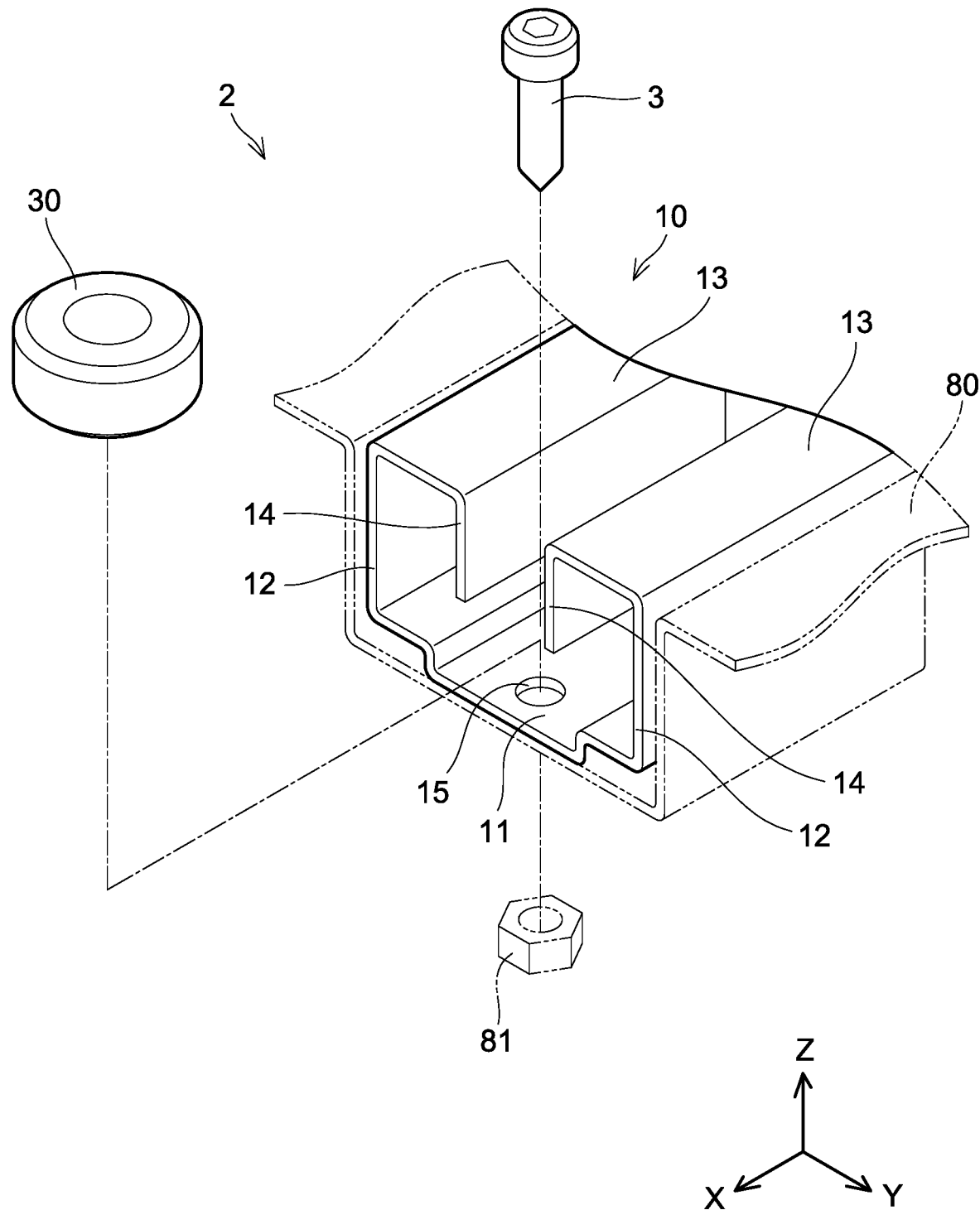
FIG. 2 is a perspective view of a lower rail with a retainer and a bolt detached therefrom.

The seat slider device 2 comprises retainers 30 configured to temporarily retain the bolts 3 to the lower rail 10. FIG. 2 shows an exploded perspective view of a part of the lower rail 10 with one pair of the retainer 30 and the bolt 3 detached from the lower rail. In FIG. 2, the floor panel 80 to which the seat slider device 2 is attached and a nut 81 to which the bolt 3 is fixed are depicted by double-dotted chain lines. Firstly, a structure of the lower rail 10 will be described with reference to FIG. 2.

The lower rail 10 comprises a bottom plate 11, a pair of outer vertical plates 12, a pair of upper plates 13, and a pair of inner vertical plates 14. It should be noted that the bottom plate 11, the pair of outer vertical plates 12, the pair of upper plates 13, and the pair of inner vertical plates 14 are fabricated from a single steel plate, however, they will be described as different parts as above for the purpose of convenience.

A through hole 15 is provided in the bottom plate 11. The outer vertical plates 12 extend upward respectively from both ends of the bottom plate 11 in the rail short direction (in the Y direction). The upper plates 13 horizontally extend to inside of the lower rail respectively from upper ends of the outer vertical plates 12. Here, "inside" means inward directions toward a center of the lower rail 10 in the rail short direction. In other words, the upper plates 13 extend to approach each other.

The inner vertical plates 14 extend downward respectively from inner ends of the upper plates 13. The inner plates 14 are parallel and face to each other. Wheels (not shown) of the upper rail 20 are housed in spaces defined by the outer vertical plates 12, the upper plates 13, and the inner vertical plates 14. Since any conventional upper rail can be used as the upper rail 20, detailed description and drawings for the upper rail 20 are omitted.

The lower rail 10 (seat slider device 2) is fixed to the floor panel 80 with the bolt 3. The bolt 3 passes through the through hole 15 and the floor panel 80 and is fixed with the nut 81. It should be noted that the nut 81 is welded on a lower surface of the floor panel 80, however, FIG. 2 shows the nut 81 is separated from the floor panel 80 to help understanding.

A hexagonal hole is provided in an upper surface of a head 3a of the bolt 3. The bolt 3 is configured to be tightened with a hexagon wrench, and the head 3a has a cylindrical shape. A washer is held between the bottom plate 11 of the lower rail 10 and the head 3a of the bolt 3, however, the washer is invisible in FIG. 2 because it is embedded in a lower portion of the retainer 30.

Figure 3:
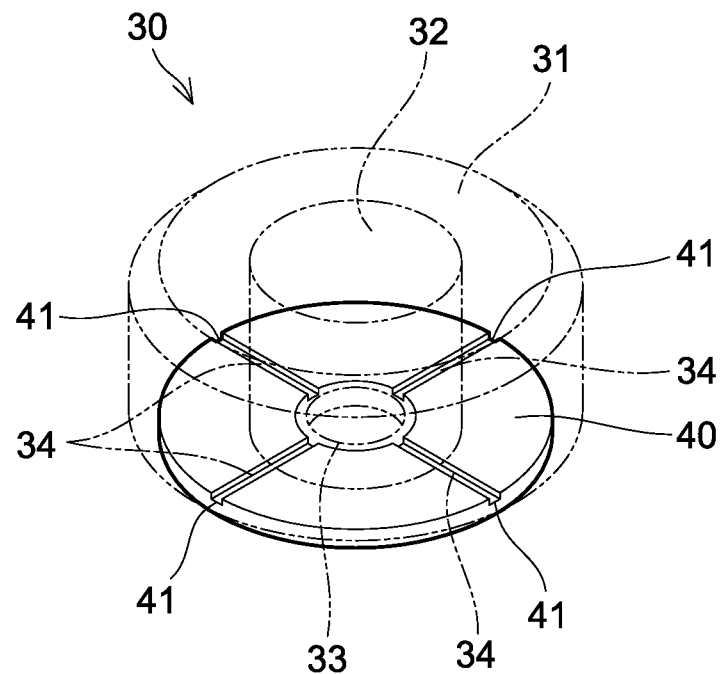
FIG. 3 is a perspective view of the retainer.
Figure 4:
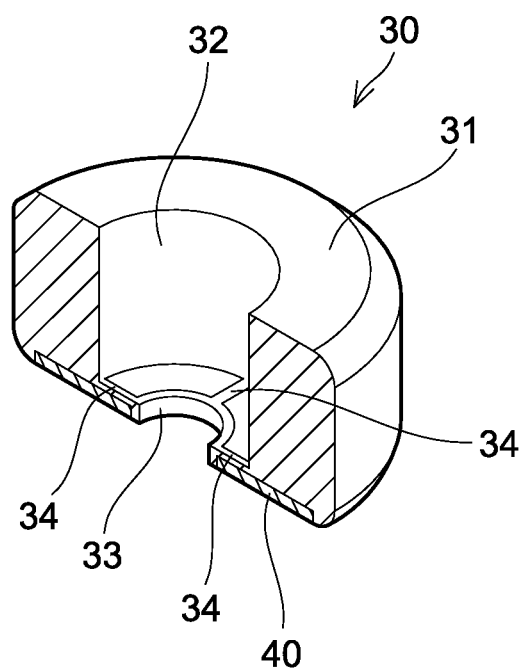
FIG. 4 is a perspective view of a vertically cut half of the retainer.

FIG. 3 shows a perspective view of the retainer 30, and FIG. 4 shows a perspective view of a vertically cut half of the retainer 30. The retainer 30 comprises a spacer 31 constituted of resin and a retaining ring 33. In FIG. 3, the spacer 31 and the retaining ring 33 are depicted by double-dotted chain lines to help understanding for a structure of a washer 40. As described, the washer 40 is embedded in the lower portion of the retainer 30. The spacer 31 and the retaining ring 33 are fabricated by insert molding in which the washer 40 is placed in a mold and molten resin is injected into the mold.

The spacer 31 has a tube shape and is provided with a center hole 32. The center hole 32 is coaxially positioned with a hole of the washer 40. The spacer 31 according to the present embodiment has a cylindrical tube shape, however, the spacer 31 may have a conical tube shape in which a diameter thereof decreases upward.

The retaining ring 33 is disposed on an inner surface of the washer 40. As shown in FIG. 3, a plurality of grooves 41 is provided in a surface of the washer 40 and the grooves 41 extend from an outer edge of the washer 40 to an inner edge thereof. As shown in FIG. 4, resin rods 34 are embedded in the grooves 41 respectively, and the spacer 31 and the retaining ring 33 are connected to each other by the resin rods 34. The spacer 31, the retaining ring 33, and the resin rods 34 are integrally fabricated by resin injection molding. Thus, the resin rods 34 fill the grooves 41 with no space left therein. The resin rods 34 do not stick out from the grooves 41.

An inner diameter of the retaining ring 33 is slightly smaller than a diameter of the bolt 3. The bolt 3 is press-fitted to the retaining ring 33. The bolt 3 is retained in the retainer 30 by the bolt 3 being press-fitted to the retaining ring 33. Since the retaining ring 33 is connected to the spacer 32 by the plurality of resin rods 34, the retaining ring 33 does not detach from the washer 40 when the bolt 3 is pressed into the retaining ring 33.

Figure 5:
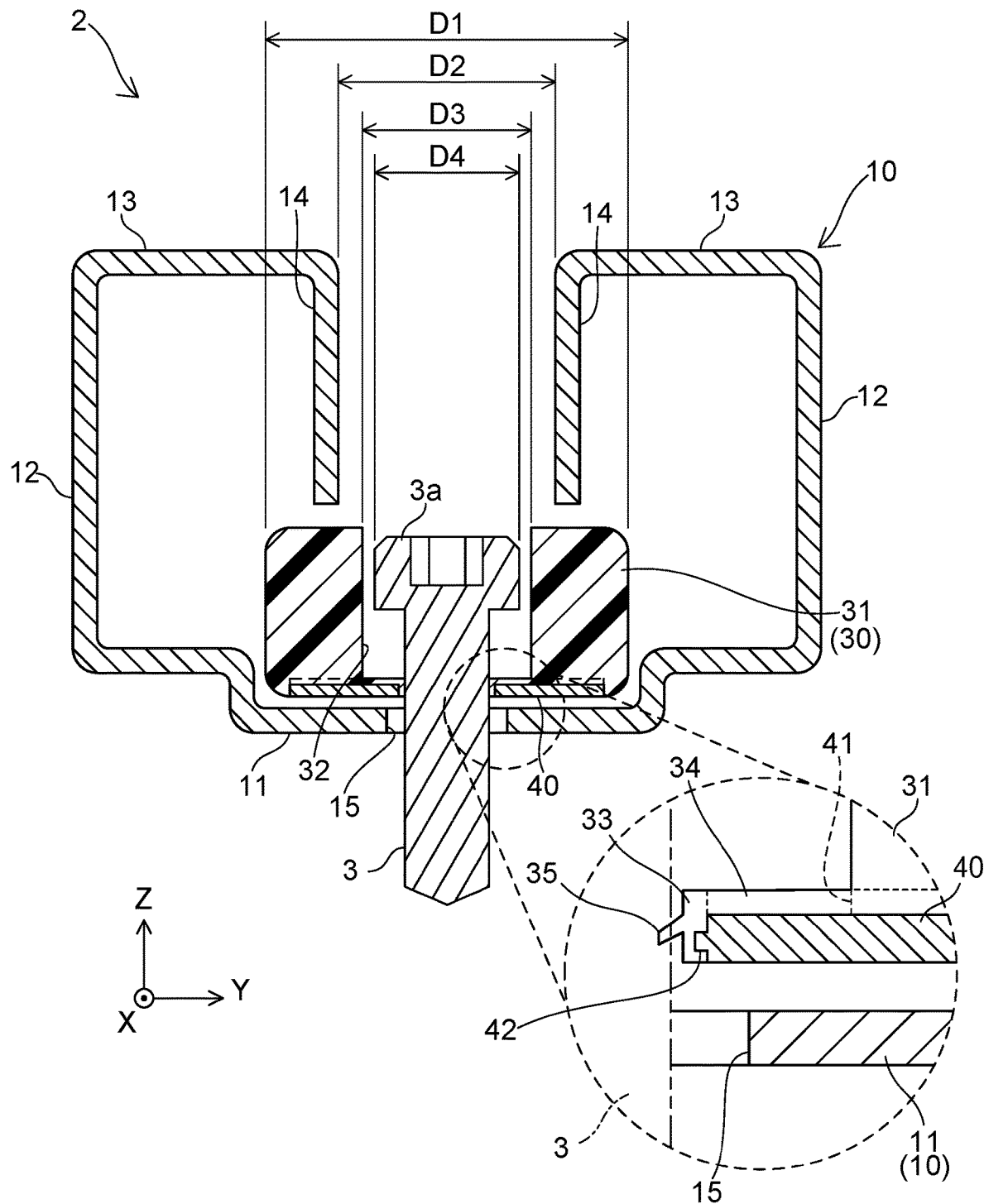
FIG. 5 is a cross sectional view of the seat slider device according to the first embodiment.

FIG. 5 shows a cross sectional view of the seat slider device 2. The cross section of FIG. 5 is obtained by cutting the seat slider device 2 along a plane perpendicular to the rail longitudinal direction. FIG. 5 also shows a cross section of the retainer 30 in which the bolt 3 is retained. The retainer 30 is retaining the bolt 3 and an end of the bolt 3 is passed through the through hole 15 of the bottom plate 11 of the lower rail 10. An outer diameter D1 of the spacer 31 (outer diameter D1 of the retainer 30) is larger than a gap D2 between the pair of inner vertical plates 14. Thus, the retainer 30 (bolt 3) does not detach upward (in the +Z direction). Further, since the bolt 3 is passed through the through hole 15, movement of the bolt 3 is restricted with respect to a horizontal plane (XY plane). That is, the retainer 30 temporarily retains the bolt 3 within the lower rail 10 by holding the bolt 3 with its end passed through the through hole 15. Since the retainer 30 also holds the washer 40, it also temporarily retains the washer 40 with the bolt 3 passed through the washer 40.

An inner diameter D3 of the spacer 31 is larger than an outer diameter D4 of the head 3a of the bolt 3. The head 3a is retained inside the spacer 31.

The lower right diagram of FIG. 5 is an enlarged view of a vicinity of the retaining ring 33. As described, the resin rods 34 are embedded in the grooves 41 provided in the surface of the washer 40, and the surface of the washer 40 is exposed. The resin rods 34 do not stick out from the grooves 41. When the bolt 3 is tightened into the floor panel 80, a lower surface of the head 3a comes into direct contact with the surface of the washer 40. Since no resin is interposed between the head 3a and the washer 40 when the bolt 3 is tightened, the bottom plate 11 can be firmly fixed with the bolt 3, and the tightened bolt 3 less likely loosens.

In the enlarged view of the lower right diagram of FIG. 5, the bolt 3 is depicted by a double-dotted chain line. A protrusion 42 is provided on the inner surface of the washer 40, and this protrusion 42 bites into the retaining ring 33. The protrusion 42 helps to suppress the retaining ring 33 from detaching from the washer 40, as well.

A flap 35 is provided on an inner surface of the retaining ring 33, and the flap 35 extends downward toward the center of the ring. The retaining ring 33 (retainer 30) holds the bolt 3 by the flap 35 being stuck in the bolt 3. FIG. 4 omits depiction of the flap 35.

As described, the retainer 30 temporarily retains the bolt 3 and the washer 40 within the lower rail 10. The seat slider device 2 according to the present embodiment allows the bolt 3 and the washer 40 to be retained in the lower rail 10 without disposing an extra member dedicated to fixing the lower rail 10 to the floor panel 80 below the bottom plate 22 of the lower rail 10. When the seat slider device 2 is set on the floor panel 80 and the temporarily retained bolt 3 is then tightened with a hexagon wrench, the bolt 3 is fixed to the nut 81 (see FIG. 2) and the lower rail 10 is fixed to the floor panel 80. The washer 40 is held between the head 3a of the bolt 3 and the bottom plate 11. As such, the extra member is not interposed between the lower rail 10 and the floor panel 80 when the bolt 3 is fixed to the floor panel 80 (see FIGS. 1 and 2), thus there is no unnecessary gap between the lower rail 10 and the floor panel 80.

The washer 40 is held in the resin retainer 30 with its surface (part of the surface excluding the grooves 41) exposed. Since the lower surface of the head 3a directly contacts the washer 40 when the bolt 3 is tightened, the bottom plate 11 can be firmly fixed and the tightened bolt 3 less likely comes loose.

As shown in FIG. 1, the lower rail 10 is fixed to the floor panel 80 with the plurality of bolts 3. Each of the bolts 3 is temporarily retained in the lower rail 10 by its corresponding retainer 30 shown in FIGS. 2 to 5.

Figure 6:
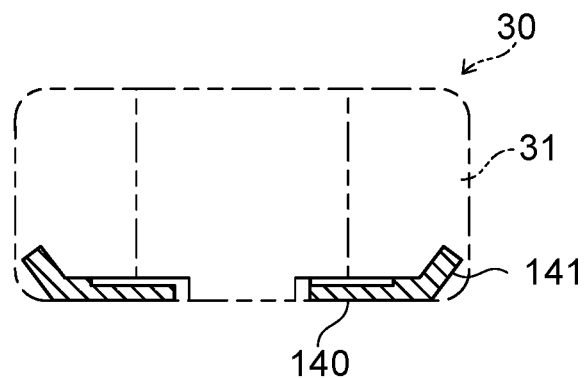
FIG. 6 is a cross sectional view of a washer according to a variant.

With reference to FIG. 6, the retainer 30 including a washer 140 according to a variant will be described. In FIG. 6, the retainer 30 is depicted by a double-dotted chain line. An outer edge 141 of the washer 140 is inclined upward and the outer edge 141 bites into the spacer 31. This configuration enables the washer 140 to less likely detach from the spacer 31.

Figure 7:
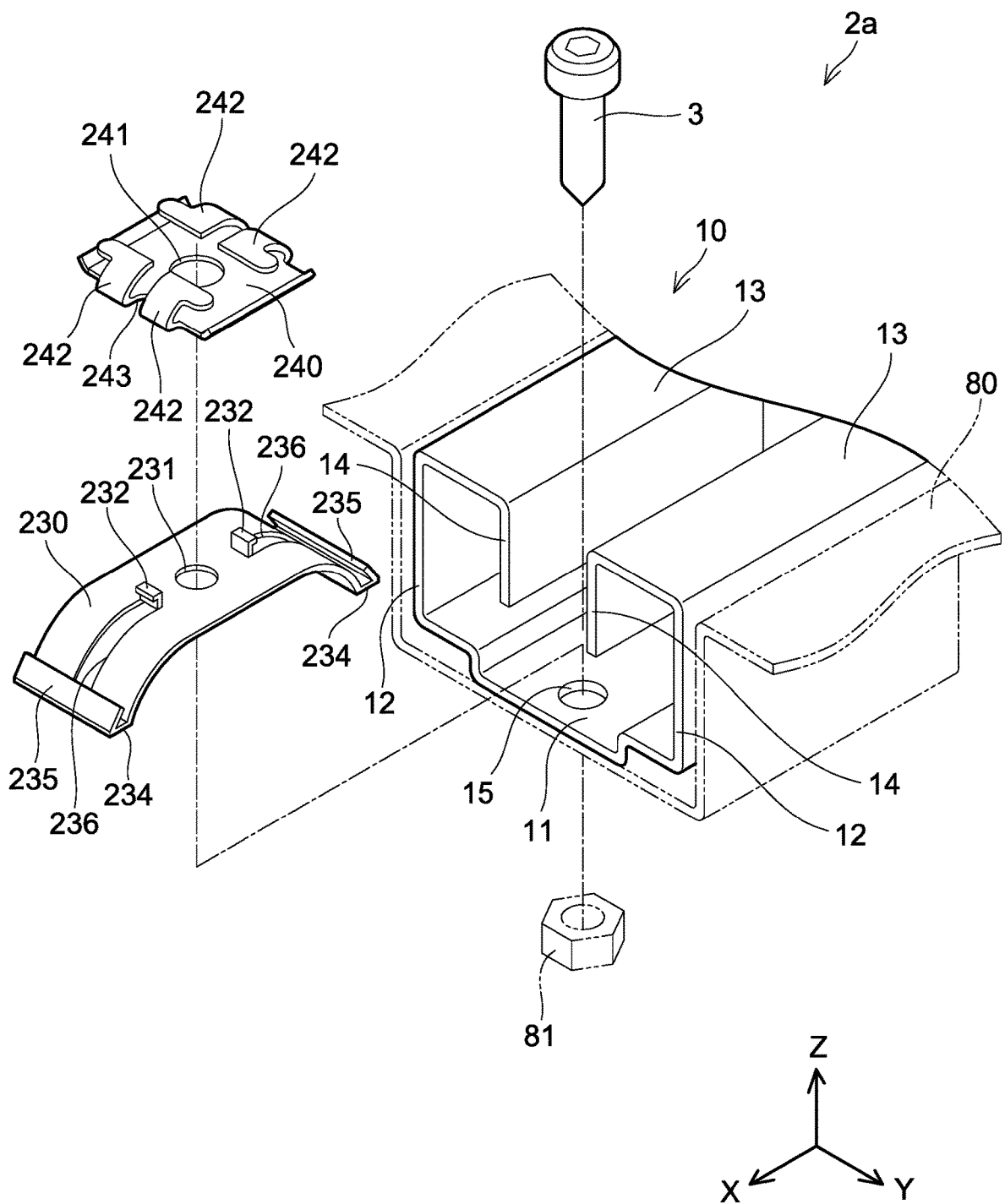
FIG. 7 is an exploded view of a seat slider device according to a second embodiment.

(Second Embodiment) A seat slider device 2a according to a second embodiment will be described with reference to FIGS. 7 and 8. FIG. 7 shows an exploded view in which a retainer 230 and a washer 240 are detached from the lower rail 10. In FIG. 7, the floor panel 80 and the nut 81 are depicted by double-dotted chain lines. FIG. 7 shows a cross section of the lower rail 10. The lower rail 10 extends along a X direction in the coordinate system in the drawing, and the washer 240 and the retainer 230 are disposed within the lower rail 10.

Figure 8:
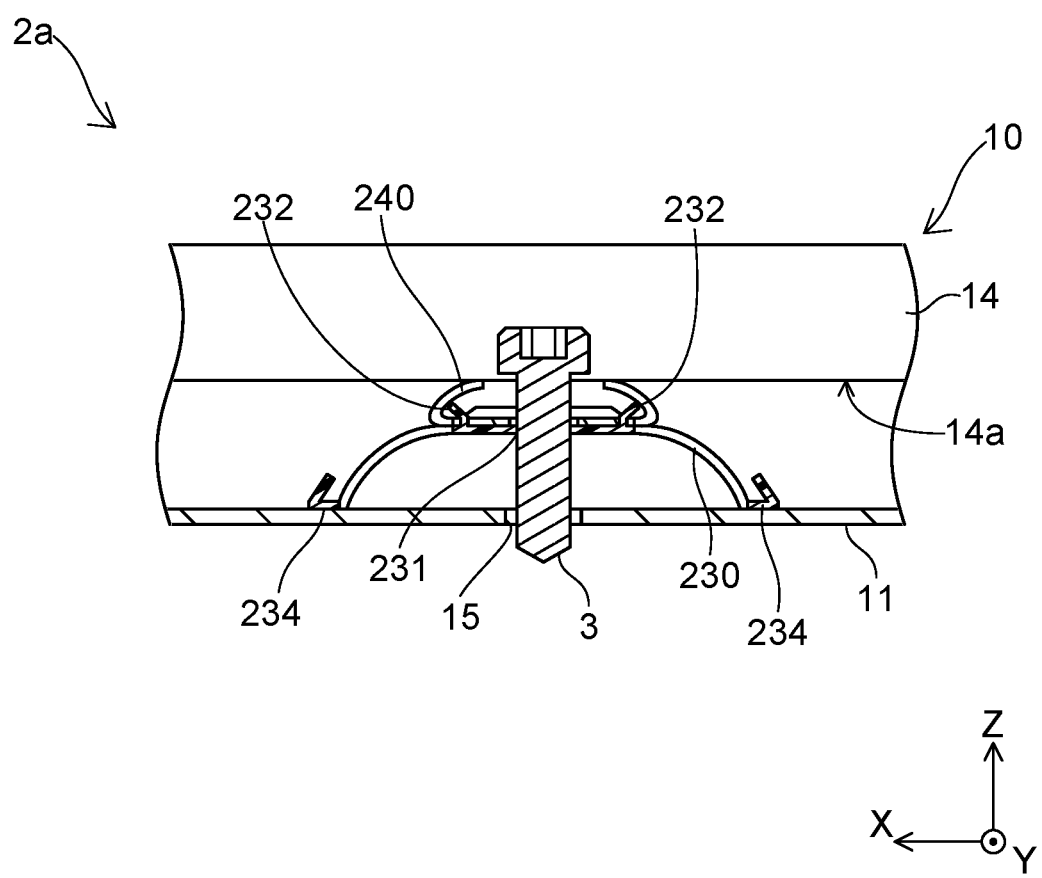
FIG. 8 is a cross sectional view of the seat slider device according to the second embodiment.

FIG. 8 shows a cross section of the seat slider device 2a that is obtained by cutting the seat slider device 2a along a plane perpendicular to the rail short direction. FIG. 8 shows cross sections of the retainer 230 and the washer 240.

The seat slider device 2a according to the second embodiment also enables the bolt 3 and the washer 240 to be temporarily retained within the lower rail 10 before the lower rail 10 is fixed to the floor panel 80.

Each washer 240 comprises a rectangular main body provided with a hole 241 and four arms 242 which extend upward and toward a center of the main body from ends of the main body in the rail longitudinal direction. The arms 242 are for preventing dust from entering between the washer 240 and the bottom plate 11 of the lower rail 10.

Notches 243 are provided respectively between two of the arms 242 that are adjacent to each other in the rail short direction and between the other two arms 242. Ends of the main body of the washer 240 in the rail short direction are inclined upward and outward.

The retainer 230 is constituted of resin or a metal plate. The retainer 230 has a U-shape. The retainer 230 is disposed in the lower rail 10 with the U-shape inversed. Owing to the U-shape, the retainer 230 can elastically flex in an up-down direction. The retainer 230 is held and compressed between the bottom plate 11 and lower ends 14a of the inner vertical plates 14 within the lower rail 10 (see FIG. 8). Slits 236 are provided in arms of the U-shape of the retainer 230, respectively. The slits 236 reduce an elastic constant of the retainer 230, thus the retainer 230 can be easily held in the lower rail 10.

Both ends 234 of the retainer 230 (both ends of the U-shape) are in contact with the bottom plate 11. The washer 240 is held between a center of the retainer 230 (center of the U-shape) and the lower ends 14a of the inner vertical plates 14. The washer 240 is retained within the lower rail 10 by the retainer 230.

A hole 231 is provided in the center of the retainer 230, and the bolt 3 is temporarily retained by being press-fitted in the hole 231. The retainer 230 retains the bolt 3 with an end of the bolt 3 passed through the through hole 15 of the bottom plate 11.

Hooks 232 are disposed near the hole 231 of the retainer 230. The hooks 232 are configured to hold the washer 240 by being hooked in the notches 243 of the washer 240.

Inclined surfaces 235 are disposed respectively at both ends of the retainer 230 in the rail longitudinal direction. The inclined surfaces 235 are inclined upward.

The retainer 230 temporarily retains the bolt 3 and the washer 240 within the lower rail 10. The seat slider device 2a according to the second embodiment allows the bolt 3 and the washer 240 to be temporarily retained in the lower rail 10 without disposing an extra member dedicated to fixing the lower rail 10 to the floor panel 80 below the bottom plate 11 of the lower rail 10. When the seat slider device 2a is set onto the floor panel 80 and the temporarily retained bolt 3 is then tightened with a hexagon wrench, the bolt 3 is fixed to the nut 81 (see FIG. 2) and the lower rail 10 is fixed to the floor panel 80. The washer 240 is held between the head 3a of its corresponding bolt 3 and the bottom plate 11. As such, the extra member is not interposed between the lower rail 10 and the floor panel 80 when the bolt 3 is fixed to the floor panel 80 (see FIGS. 1 and 2), thus there is no unnecessary gap between the lower rail 10 and the floor panel 80.

The lower rail 10 is fixed to the floor panel 80 with the plurality of bolts 3. Each of the bolts 3 is temporarily retained within the lower rail 10 by its corresponding retainer 230.

Figure 9:
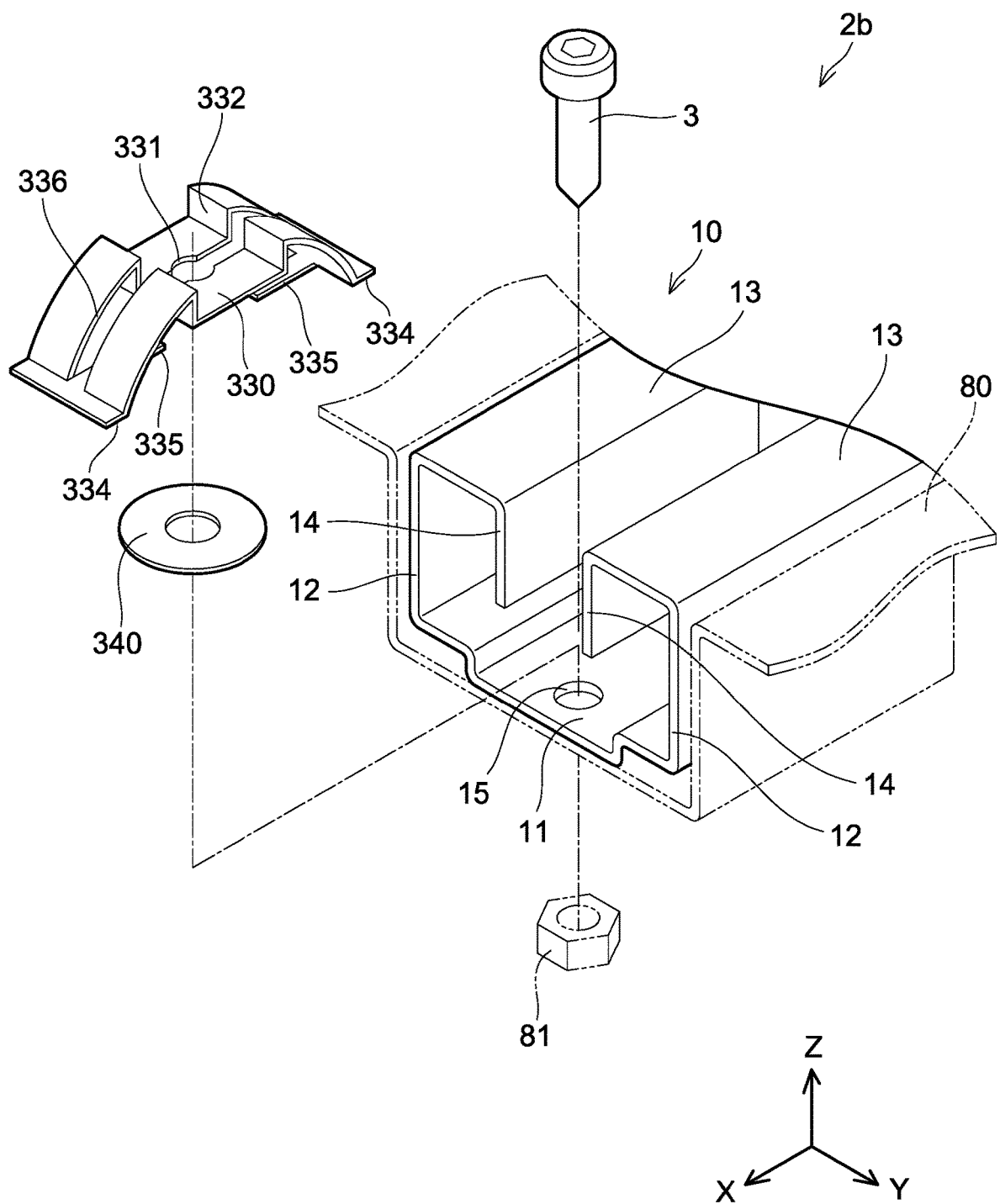
FIG. 9 is an exploded view of a seat slider device according to a third embodiment.

(Third Embodiment) A seat slider device 2b according to a third embodiment will be described with reference to FIGS. 9 and 10. FIG. 9 is an exploded view in which a retainer 330 and a washer 340 are detached from the lower rail 10. The washer 340 has a simple disk shape. In FIG. 9, the floor panel 80 and the nut 81 are depicted by double-dotted chain lines. FIG. 9 shows a cross section of the lower rail 10. The lower rail 10 extends in the X direction in the coordinate system of the drawing. The washer 340 and the retainer 330 are disposed within the lower rail 10.

Figure 10:
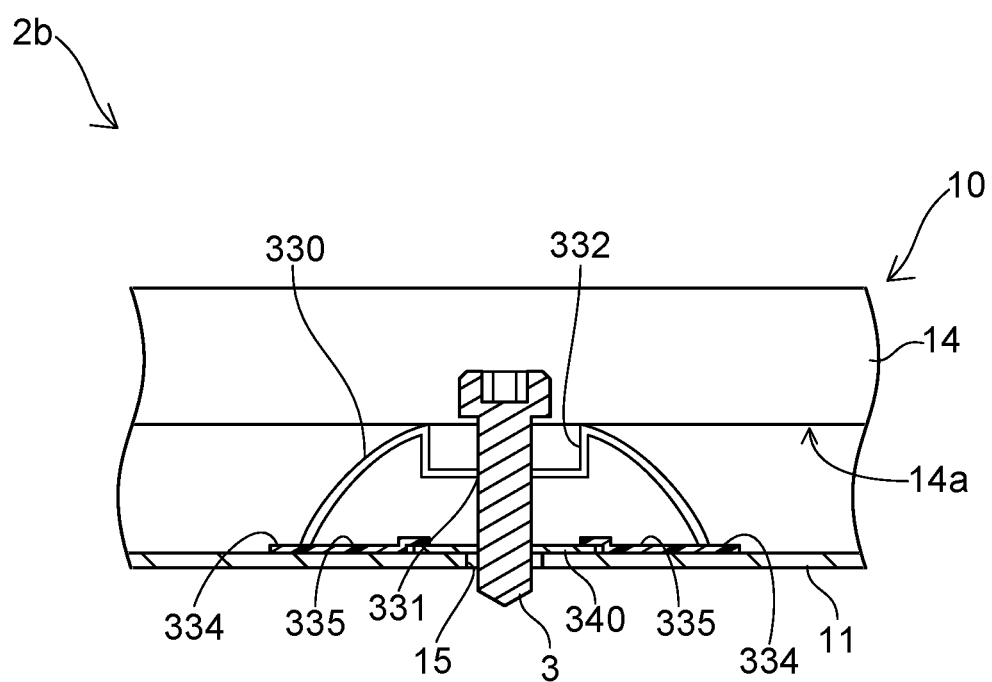
FIG. 10 is a cross sectional view of the seat slider device according to the third embodiment.

FIG. 10 shows a cross section of the seat slider device 2b that is obtained by cutting the seat slider device 2b along a plane perpendicular to the rail short direction. FIG. 10 shows cross sections of the retainer 330 and the washer 340.

The seat slider device 2b according to the third embodiment enables the bolt 3 and the washer 340 to be temporarily retained within the lower rail 10 before the lower rail 10 is fixed to the floor panel 80, as well.

The retainer 330 is constituted of resin or a metal plate. The retainer 330 has a U-shape. The U-shaped retainer 330 can elastically flex in the up-down direction. The retainer 330 is disposed inside the lower rail 10 with the U-shape inverted. The retainer 330 is held and compressed between the bottom plate 11 and the lower ends 14a of the inner vertical plates 14 within the lower rail 10 (see FIG. 10). Slits 336 are provided in arms of the U-shape of the retainer 330, respectively. The slits 336 reduces an elastic constant of the retainer 330, thus the retainer 330 can be easily held in the lower rail 10.

Arms 335 extend respectively from both ends 334 of the retainer 330 (both ends of the U-shape) along the bottom plate 11. The washer 340 is held between the bottom plate 11 and ends of the arms 335.

A recess 332, which is recessed downward, is provided in a center of the retainer 330 (center of the inverted U-shape), and a hole 331 is provided in the recess 332. The bolt 3 is temporarily retained by being press-fitted in the hole 331.

The retainer 330 retains the bolt 3 with an end of the bolt 3 passed through the through hole 15 of the bottom plate 11.

The retainer 330 temporarily retains the bolt 3 and the washer 340 within the lower rail 10. The seat slider device 2b according to the third embodiment allows the bolt 3 and the washer 340 to be temporarily retained in the lower rail 10 without disposing an extra member dedicated to fixing the lower rail 10 to the floor panel 80 below the bottom plate 11 of the lower rail 10. As such, the extra member is not interposed between the lower rail 10 and the floor panel 80 when the bolt 3 is fixed to the floor panel 80 (see FIGS. 1 and 2), thus there is no unnecessary gap between the lower rail 10 and the floor panel 80.

The lower rail 10 is fixed to the floor panel 80 with the plurality of bolts 3. Each of the bolts 3 is temporarily retained within the lower rail 10 by one retainer 330.

Figure 11:
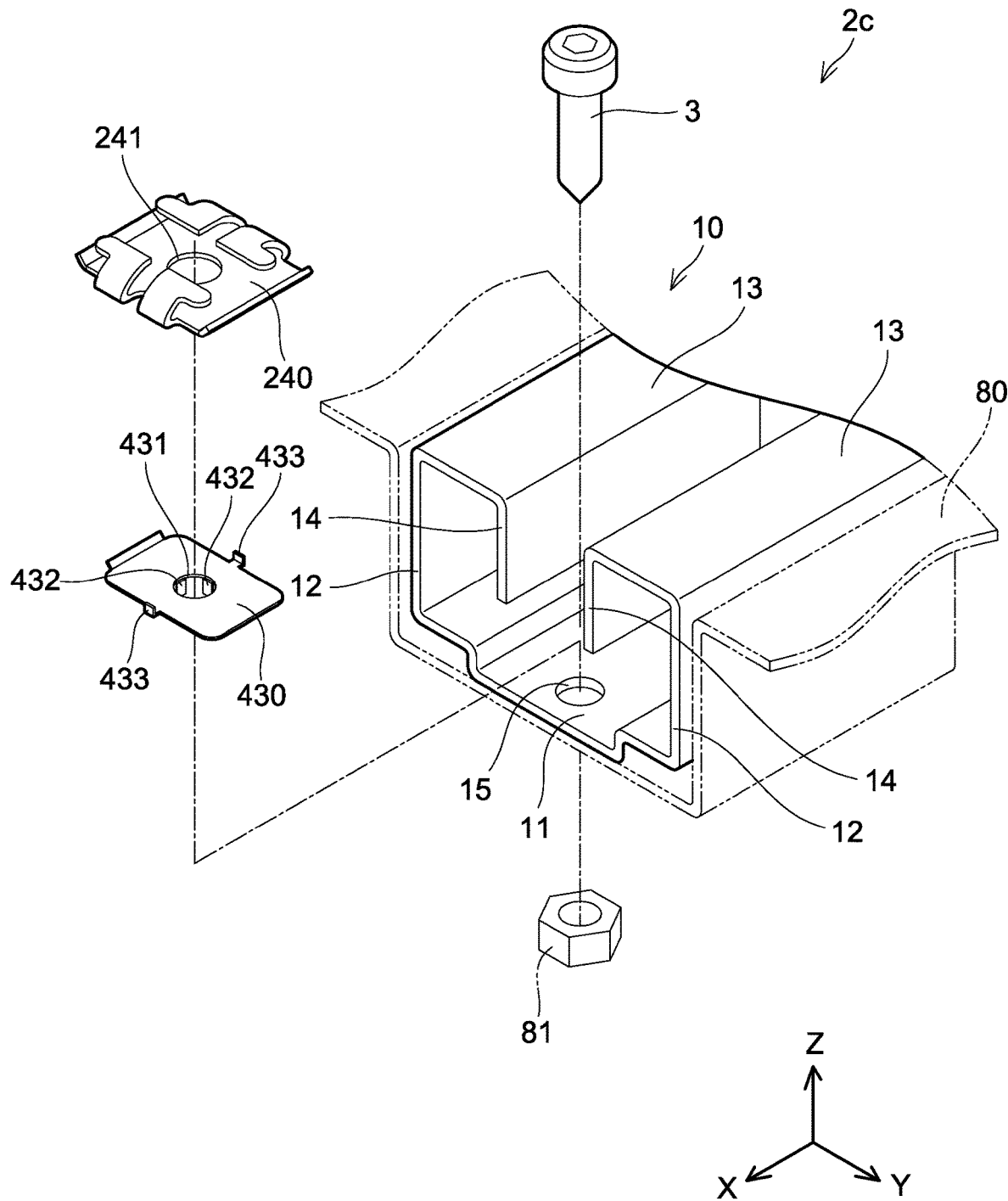
FIG. 11 is an exploded view of a seat slider device according to a fourth embodiment.

(Fourth Embodiment) A seat slider device 2c according to a fourth embodiment will be described with respect to FIGS. 11 to 13. FIG. 11 is an exploded view in which a retainer 430 and the washer 240 are detached from the lower rail 10. In FIG. 11, the floor panel 80 is depicted by double-dotted chain lines. FIG. 11 shows a cross section of the lower rail 10. The lower rail 10 extends in the +X direction in the coordinate system of the drawing. The washer 240 and the retainer 430 are disposed within the lower rail 10. Since the washer 240 is the same as the washer 240 in the seat slider device 2a according to the second embodiment, detailed description for the washer 240 is omitted.

The seat slider device 2c according to the fourth embodiment enables the bolt 3 and the washer 240 to be temporarily retained within the lower rail 10 before the lower rail 10 is fixed to the floor panel 80.

The retainer 430 is constituted of a thin metal plate. The retainer 430 comprises a rectangular main body provided with a hole 431, outer hooks 433 which extend upward respectively from both edges of the main body in the rail longitudinal direction, and inner hooks 432 which extend downward from an edge of the hole 431.

Figure 12:
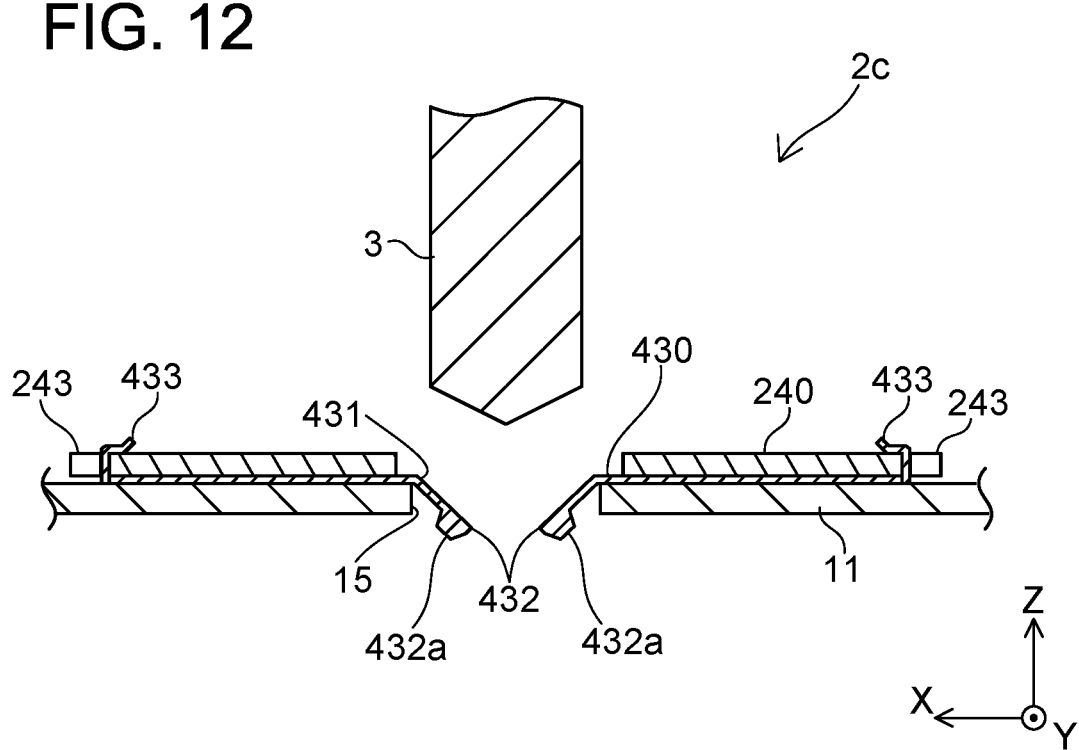
FIG. 12 is a cross sectional view of a retainer and a washer (before a bolt is inserted).

FIG. 12 shows cross sections of the retainer 430 placed on the bottom plate 11 of the lower rail 10 and the washer 240 placed on the retainer 430. In FIG. 12, the bolt 3 is not inserted in the hole 431 yet. The washer 240 is retained by the outer hooks 433 of the retainer 430. The outer hooks 433 hold the washer 240 by being hooked in the notches 243 of the washer 240.

The inner hooks 432 extend downward from the edge of the hole 431 toward the center of the hole 431. Ends 432a of the inner hooks 432 protrude outward.

Figure 13:
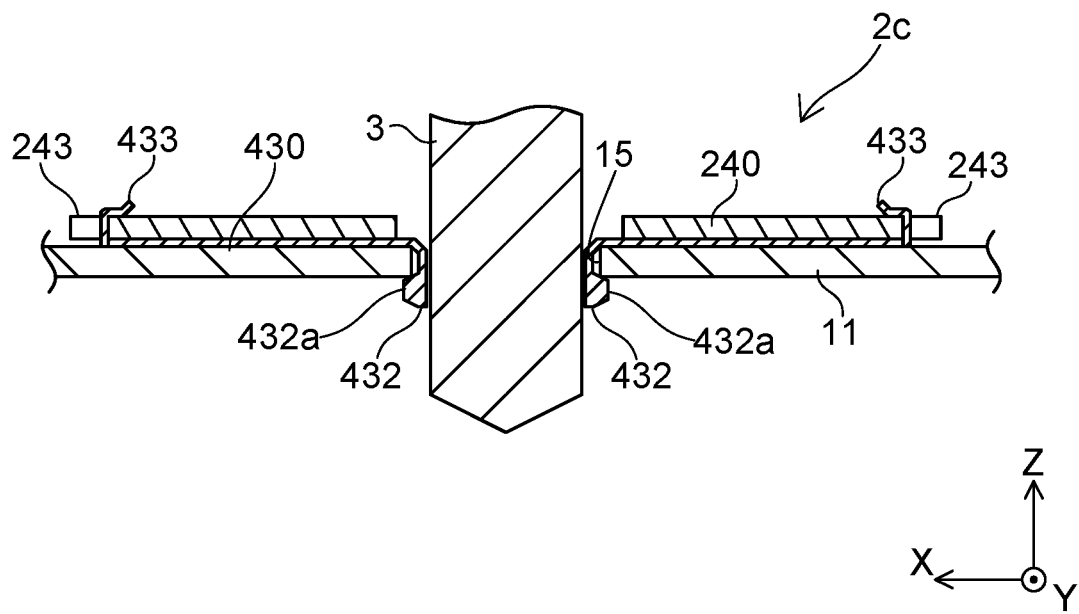
FIG. 13 is a cross sectional view of the retainer and the washer (with the bolt inserted).

In FIG. 13, the bolt 3 is passed through the hole 431. The bolt 3 is press-fitted in the hole 431. When the bolt 3 is press-fitted in the hole 431, the inner hooks 432 are thereby bent outward and the outwardly protruding ends 432a are hooked on the edge of the through hole 15 of the bottom plate 11. That is, the retainer 430 temporarily retains the washer 240 and the bolt 3 within the lower rail 10.

The lower rail 10 is fixed to the floor panel 80 with the plurality of bolts 3. Each of the bolts 3 is temporarily retained within the lower rail 10 by its corresponding retainer 430.

The retainer 430 according to the fourth embodiment is constituted of a thin metal plate, however, a retainer that includes the outer hooks 433 and the inner hooks 432 and serves the same function as the retainer 430 may be constituted of resin.

Some of the technical features described in the embodiments will herein be listed. Each of the seat slider devices according to the first to fourth embodiments enables the retainers to temporarily retain the bolts and the washers within the lower rail. The bolts are retained with the bolts through the washers and the through holes 15 of the lower rail 10. When the seat slider device is placed on the vehicle body (floor panel 80) and the temporarily retained bolts 3 are then tightened, the lower rail is fixed to the vehicle body (floor panel 80). Each of the seat slider devices according to the embodiments does not require any extra members below the lower rail for temporarily retaining the bolts. Thus, such extra members are not interposed between the bottom plate and the floor panel 80 when the seat slider device is fixed to the vehicle. Since such extra members are not interposed between the lower rail 10 and the floor panel 80 when the bolts 3 are fixed to the floor panel 80 (see FIGS. 1 and 2), there is no unnecessary gap between the lower rail 10 and the floor panel 80.

In the seat slider device 2c according to the fourth embodiment, it is possible that some portions of the inner hooks 432 result in being interposed between the bottom plate 11 and the floor panel 80. However, the inner hooks 432 are not a cumber even if they are interposed between the bottom plate 11 and the vehicle because they are small.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. A seat slider device comprising:
    an upper rail attachable to a seat;
    a lower rail slidably holding the upper rail;
    a bolt fixing the lower rail to a vehicle body;
    a washer through which the bolt passes; and
    a retainer configured to retain the bolt to the lower rail before the lower rail is fixed to the vehicle body with the bolt,
   wherein
   the lower rail comprises:
      an elongate bottom plate including a through hole;
      a pair of outer vertical plates, the outer vertical plates extending upward respectively from ends of the bottom plate in a short direction;
      a pair of upper plates, the upper plates horizontally extending respectively from upper ends of the outer vertical plates to an inside of the lower rail; and
      a pair of inner vertical plates, the inner vertical plates extending downward respectively from inner ends of the upper plates,
   the retainer comprises:
      a spacer constituted of resin, integrated on the washer, and having a tube shape, wherein an outer diameter of the spacer is larger than a gap between the inner vertical plates and an inner diameter of the spacer is equal to or larger than an outer diameter of a head of the bolt; and
      a retaining ring constituted of resin and provided on an inner surface of the washer, wherein a threaded portion of the bolt is press-fitted to the retaining ring;
   a groove is provided in a surface of the washer;
   the spacer and the retaining ring are connected to each other by a resin rod disposed in the groove; and
   the retainer is arranged in the lower rail and is configured to retain the bolt with the bolt through the washer and the through hole.

2. The seat slider device of claim 1, wherein an outer edge of the washer is inclined upward and bites into the spacer.

3. The seat slider device of claim 1, wherein
    a protrusion is provided on the inner surface of the washer, and
    the protrusion is configured to bite into the retaining ring.

* * * * *